US008356331B2

(12) United States Patent
Steele et al.

(10) Patent No.: US 8,356,331 B2
(45) Date of Patent: Jan. 15, 2013

(54) PACKET STRUCTURE FOR A MOBILE DISPLAY DIGITAL INTERFACE

(75) Inventors: Brian Steele, Denver, CO (US); George Alan Wiley, San Diego, CA (US); Shashank Shekhar, Erie, CO (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 12/116,018

(22) Filed: May 6, 2008

(65) Prior Publication Data
US 2008/0279187 A1 Nov. 13, 2008

Related U.S. Application Data

(60) Provisional application No. 60/928,488, filed on May 8, 2007.

(51) Int. Cl.
*H04N 7/173* (2011.01)
*H04N 7/16* (2011.01)
*G06F 15/16* (2006.01)
*H04L 12/26* (2006.01)
*H04J 3/16* (2006.01)
*H04J 3/18* (2006.01)
*H04J 3/06* (2006.01)

(52) U.S. Cl. .......... 725/147; 725/62; 725/117; 709/232; 709/246; 709/247; 370/230; 370/346; 370/477; 370/503

(58) Field of Classification Search .......... 370/230, 370/345–349, 469, 474–477, 503–505; 709/232, 709/246–247; 725/62, 117, 147
See application file for complete search history.

(56) References Cited

U.S. PATENT DOCUMENTS

| 5,410,308 | A | 4/1995 | Keesen |
| 6,760,772 | B2 | 7/2004 | Zou et al. |
| 7,286,536 | B2 * | 10/2007 | Greis et al. .................. 370/392 |
| 7,315,265 | B2 | 1/2008 | Wiley et al. |
| 8,031,626 | B2 | 10/2011 | Wiley et al. |
| 2002/0089517 | A1 | 7/2002 | Ludtke |
| 2005/0157758 | A1 * | 7/2005 | Yoo .............................. 370/505 |
| 2005/0216599 | A1 * | 9/2005 | Anderson et al. .............. 709/232 |

(Continued)

FOREIGN PATENT DOCUMENTS
EP 0383557 A1 8/1990
(Continued)

OTHER PUBLICATIONS

International Search Report for PCT/US2008/063109. International Searching Authority—European Patent Office. Feb. 18, 2010.
Written Opinion of the International Searching Authority for PCT/US2008/063109. International Searching Authority—European Patent Office, Feb. 18, 2010.

(Continued)

*Primary Examiner* — Kristine Kincaid
*Assistant Examiner* — Gigi L Dubasky
(74) *Attorney, Agent, or Firm* — Nicholas J. Pauley; Sam Talpalatsky; Jonathan T. Velasco

(57) ABSTRACT

A packet structure for a Mobile Display Digital Interface (MDDI) includes a flexible sub-frame length to efficiently transmit large packets. A windowless video stream packet avoids repetitive transmissions of video packets when some parameters are unchanged, saving bandwidth. An enhanced reverse encapsulation packet combines the feature of a separate round trip delay packet with a separate reverse encapsulation packet. A link freeze is used to halt a transmission of a data stream at any point in the transmission and resume the transmission by a host.

9 Claims, 9 Drawing Sheets

U.S. PATENT DOCUMENTS

| | | |
|---|---|---|
| 2009/0109207 A1 | 4/2009 | Nakamura et al. |
| 2010/0128626 A1 | 5/2010 | Anderson et al. |

FOREIGN PATENT DOCUMENTS

| | | |
|---|---|---|
| EP | 0402973 A | 12/1990 |
| EP | 0579075 A | 1/1994 |
| EP | 0579075 A2 | 1/1994 |
| JP | 06-149522 A | 5/1994 |
| JP | 6232822 A | 8/1994 |
| JP | 2002518947 A | 6/2002 |
| JP | 2004531916 | 10/2004 |
| JP | 2006527549 A | 11/2006 |
| JP | 2007528681 | 10/2007 |
| KR | 20060082652 A | 7/2006 |
| WO | 2004111596 A2 | 12/2004 |
| WO | 2005091593 A | 9/2005 |
| WO | WO2005091544 | 9/2005 |
| WO | WO2005091593 A1 | 9/2005 |
| WO | 2006075891 A1 | 7/2006 |
| WO | 2006092764 A1 | 9/2006 |
| WO | 2006112229 A1 | 10/2006 |

OTHER PUBLICATIONS

Jun Hanari and Manabu Watanabe et al: "15.2: Development of an UXGA Display System by a Digital Packet Video Link." 2001 SID International Symposium—Jun. 3-8, 2001, San Jose Convention Center, California. vol. XXXII, Jun. 30, 2001, p. 210, XP007007646.

Joseph D. Lamm et al: "30.1: Invited Paper: Digital Packet Video Link—A VESA Proposed Standard." 2003 SID International Symposium—May 20, 2003, Baltimore, Maryland, vol. XXXIV, May 20, 2003, p. 1021, XP007008292.

Kwon H M: "Frame synchronization for a channel with different data rates" 19900930; 19900930-19901003, Sep. 30, 1990, pp. 176-180, XP010002768 abstract.

European Search Report—EP11161948—Search Authority—The Hague—Aug. 24, 2011.

European Search Report—EP11161949—Search Authority—The Hague—Aug. 24, 2011.

European Search Report—EP11161950—Search Authority—The Hague—Aug. 24, 2011.

European Search Report—EP11161951—Search Authority—The Hague—Aug. 24, 2011.

* cited by examiner

PACKET STRUCTURE FOR A MOBILE DISPLAY DIGITAL INTERFACE

CLAIM OF PRIORITY UNDER 35 U.S.C. §119

The present Application for Patent claims priority to Provisional Application No. 60/928,488 entitled "VESA Standard Display Digital Interface Version 1.5" filed May 8, 2007, and assigned to the assignee hereof and hereby expressly incorporated by reference herein.

CROSS-REFERENCE TO RELATED APPLICATION FOR PATENT

The present Application for Patent is related to commonly assigned U.S. Pat. No. 6,760,772 B2, entitled "Generating and Implementing a Communication Protocol and Interface for High Speed Data Transfer", issued Jul. 6, 2004, and U.S. Pat. No. 7,315,265 entitled "Double Data Rate Serial Encoder", issued Jan. 1, 2008.

BACKGROUND

1. Field

The present invention relates generally to communication links and more particularly to a method, system, and computer program product for providing an improved packet structure for Mobile Display Digital Interface (MDDI) links.

2. Background

In the field of interconnect technologies, demand for ever increasing data rates, especially as related to video presentations, continues to grow.

The Mobile Display Digital Interface (MDDI) is a cost-effective, low power consumption, transfer mechanism that enables very-high-speed data transfer over a short-range communication link between a host and a client. MDDI requires a minimum of just four wires plus power for bidirectional data transfer that delivers a maximum bandwidth of up to 3.2 Gbits per second.

In one application, MDDI increases reliability and decreases power consumption in clamshell phones by significantly reducing the number of wires that run across a handset's hinge to interconnect the digital baseband controller with an LCD display and/or a camera. This reduction of wires also allows handset manufacturers to lower development costs by simplifying clamshell or sliding handset designs. Further, differential signaling employed with MDDI reduces electro-magnetic Interference that can occur over traditional parallel connections.

There are some improvements needed to the current MDDI systems. Currently sub-frames contain fixed sub-frame length and timing intervals. This limits the system to a fixed number of bits in each sub-frame and operates at a fixed rate. This prevents packets from spanning from one sub-frame to the next. Large packets must be delayed until the next sub-frame to be transmitted, wasting bandwidth and increasing latency. A system with flexible sub-frame length is needed to more efficiently transmit these large packets. Another improvement over a fixed sub-frame length is the ability to use unlimited sub-frame length when the link comes out of hibernation. This also saves on bandwidth because the sub-frame header packet is transmitted only once to allow the client to sync at startup.

Another improvement needed to the existing systems is a method to avoid repetitive retransmission of certain video packet data when some of the parameters are unchanged. Again, this will save on bandwidth. This is accomplished by providing a windowless video stream packet. Additionally, a system is needed to provide a way to specify what fields are contained within a video stream packet when some values have not changed. It would waste bandwidth to repeatedly retransmit the fields that contain values identical to those sent in previous packets. This is provided in a packet contents field of the flexible video stream packet.

Existing systems first transmit a round trip delay measurement packet and then transmit a separate reverse encapsulation packet in order for the host to receive data from the client. The presently claimed invention is a significant improvement over the present systems and combines the functionality of the two packets into a single enhanced reverse encapsulation packet.

SUMMARY

Aspects of the claimed invention, disclosed herein, address the above stated needs by providing a method, system, and computer program product that uses a frame structure that comprises a flexible sub-frame length. The flexible sub-frame sends a sub-frame header packet at the sub-frame boundary with an indication of a sub-frame length. When a packet is requested to be transmitted over the MDDI interface, it is not blocked from being transmitted due to insufficient remaining space in the current sub-frame. This may cause a packet to cross one or more sub-frame boundaries. If a sub-frame boundary is crossed, another sub-frame header packet is the first packet transmitted after the packet that crossed the boundary. This second sub-frame is shortened by an amount equal to the amount the previous sub-frame goes beyond the sub-frame length. This maintains timing that averages out to be similar to sub-frame timing using a fixed sub-frame length, but it does not prevent the transmission of any length of packet. In addition, this allows sub-frame header packets to be transmitted on a semi periodic basis in the event the client loses sync. An unlimited sub-frame length can also be implemented, whereby only one sub-frame header packet is transmitted when a link comes out of hibernation and the sub-frame containing packet data, comprises an unlimited length.

Another unique aspect introduced is a windowless video data packet. This aspect allows a window size defined a first time to just be re-used without having to redefine the window. This is accomplished by removing X-left, X-Right, Y-Top, Y-Bottom, X-Start, and Y-Start field coordinates from the video data packet. A bit within the existing field represents the vertical synchronization and identifies the first line of a data screen.

A flexible sub-frame is also introduced for efficiently transmitting large packets. Additionally, a flexible video data packet is disclosed that contains a field indicating which optional fields of the flexible video packet are present in the transmitted packet.

Yet another new aspect disclosed is an enhanced reverse link encapsulation packet. The enhanced reverse link encapsulation packet combines the features of a round trip delay packet with a reverse encapsulation packet in a single packet. The first part of the reverse transmission is a preamble that allows the host to sync up to the reverse link data so that it can accurately sample the reverse data. The second portion of the reverse data contains a byte count. This allows dynamic reverse link bandwidth to be allocated based on the needs of the client. The host can set an upper limit threshold of this reverse data with the maximum bytes field.

Another aspect introduced herein is a link freeze. This halts or freezes the transmission of the data stream at any point within the data stream by the host. The client is clocked off via the incoming MDDI data stream, so the result of stopping the MDDI link is that clock cycles no longer exist within the client. The host maintains the differential levels corresponding to the last transmitted data bit when entering this mode. The data stream can be then resumed by the host.

Further aspects, features, and advantages of the claimed present invention, as well as the structure and operation of the various aspects of the claimed present invention, are described in detail below with reference to the accompanying drawings.

DETAILED DESCRIPTION

Figure 1:
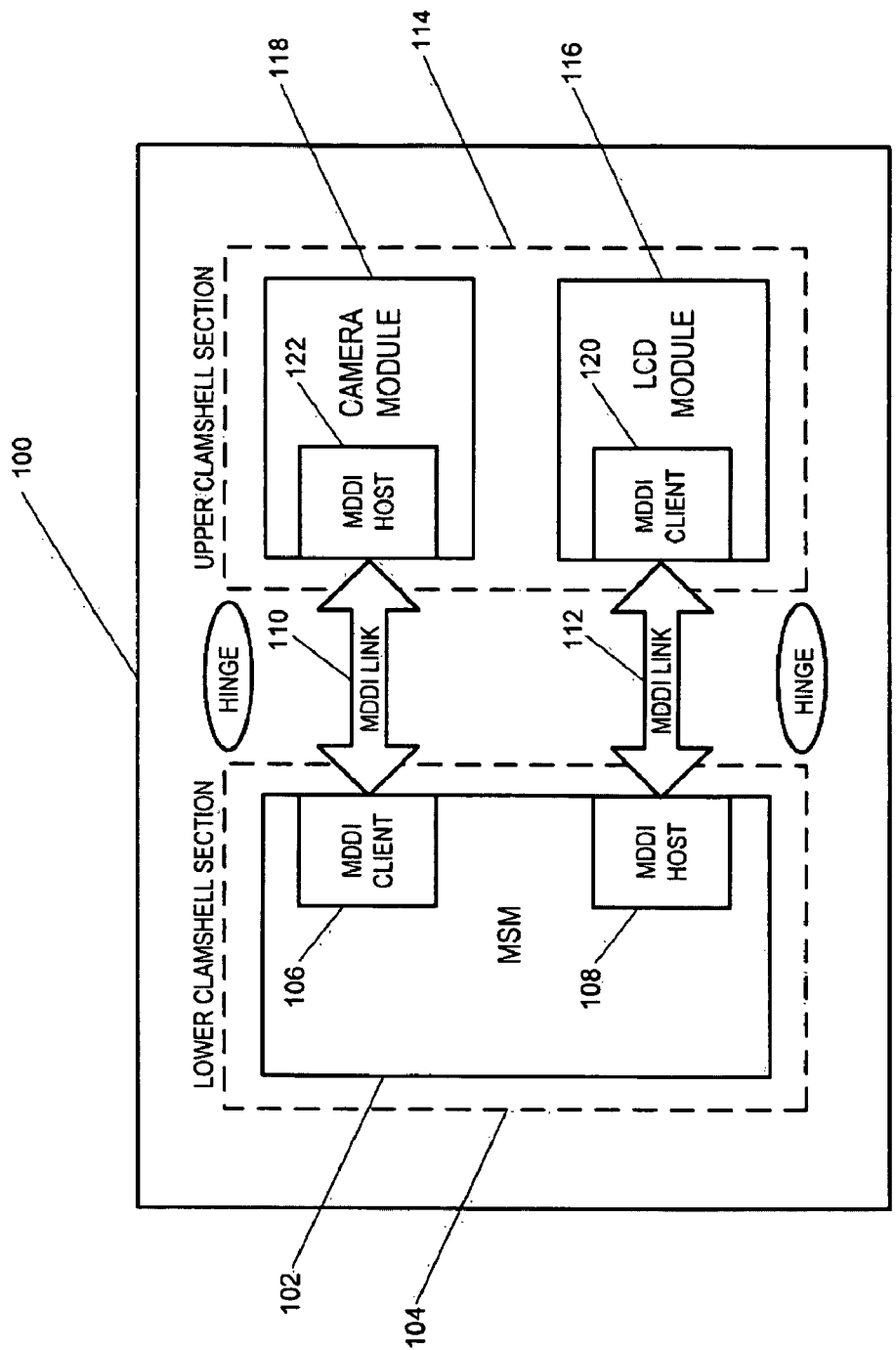
FIG. 1 is a block diagram that illustrates an example environment using a MDDI interface.

The word "exemplary" is used herein to mean "serving as an example, instance, or illustration." Any aspects described herein as "exemplary" is not necessarily to be construed as preferred or advantageous over other aspects.

The aspects described, and references in the specification to "one aspect", "an aspect", "an example aspect", etc., indicate that the aspects described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects, whether or hot explicitly described.

The Mobile Display Digital Interface (MDDI) is a cost-effective, low power consumption, transfer mechanism that enables very-high-speed serial data transfer over a short-range communication link between a host and a client. In order to fully appreciate the new features introduced herein, a brief discussion of the MDDI system is provided.

In the following, examples of MDDI will be presented with respect to a camera module contained in an upper clamshell of a mobile phone. However, it would be apparent to persons skilled in the relevant art(s) that any module having functionally equivalent features to the camera module could be readily substituted and used in aspects of this invention.

Further, according to aspects of the invention, a MDDI host may comprise one of several types of devices that can benefit from using the claimed present invention. For example, the host could be a portable computer in the form of a handheld, laptop, or similar mobile computing device. It could also be a Personal Data Assistant (PDA), a paging device, or one of many wireless telephones or modems.

Alternatively, the host could be a portable entertainment or presentation device such as a portable DVD or CD player, or a game playing device. Furthermore, the host can reside as a host device or control element in a variety of other widely used or planned commercial products for which a high speed communication link is desired with a client. For example, a host could be used to transfer data at high rates from a video recording device to a storage based client for improved response, or to a high resolution larger screen for presentations. An appliance, such as a refrigerator, that incorporates an onboard inventory or computing system and/or Bluetooth connections to other household devices, can have improved display capabilities when operating in an internet or Bluetooth connected mode, or have reduced wiring needs for in-the-door displays (a client) and keypads or scanners (client) while the electronic computer or control systems (host) reside elsewhere in the cabinet. In general, those skilled in the art will appreciate the wide variety of modern electronic devices and appliances that may benefit from the use of this interface, as well as the ability to retrofit older devices with higher data rate transport of information utilizing limited numbers of conductors available in either newly added or existing connectors or cables. At the same time, a MDDI client may comprise a variety of devices useful for presenting information to an end user, or presenting information from a user to the host. For example, a micro-display incorporated in goggles or glasses, a projection device built into a hat or helmet, a small screen or even holographic element built into a vehicle, such as in a window or windshield, or various speaker, headphone, or sound systems for presenting high quality sound or music. Other presentation devices include projectors or projection devices used to present information for meetings, or for movies and television images. Another example would be the use of touch pads or sensitive devices, voice recognition input devices, security scanners, and so forth that may be called upon to transfer a significant amount of information from a device or system user with little actual "input" other than touch or sound from the user. In addition, docking stations for computers and car kits or desk-top kits and holders for wireless telephones may act as interface devices to end users or to other devices and equipment, and employ either clients (output or input devices such as mice) or hosts to assist in the transfer of data, especially where high speed networks are involved. However, those skilled in the art will readily recognize that the claimed present invention is not limited to these devices, there being many other devices on the market, and proposed for use, that are intended to provide end users with high quality images and sound, either in terms of storage and transport or in terms of presentation at playback. The claimed present invention is useful in increasing the data throughput between various elements or devices to accommodate the high data rates needed for realizing the desired user experience.

FIG. 1 is a block diagram that illustrates an/example environment using a MDDI interface. In the example of FIG. 1, MDDI is used to interconnect modules across the hinge of a clamshell phone 100. It must be noted here that while certain aspects of the presently claimed invention will be described in the context of specific/examples, such as MDDI interconnections in a clamshell phone, this is done for illustration purposes only and should not be used to limit the present invention to such aspects. As will be understood by a person skilled in the relevant art(s) based on the teachings herein, aspects of the presently claimed invention may be used in other devices including any that may benefit from having MDDI interconnections.

Referring to FIG. 1, a lower clamshell section 104 of clamshell phone 100 includes a mobile station modem (MSM) baseband chip 102. MSM 102 is a digital baseband controller.

An upper clamshell section 114 of clamshell phone 100 includes a liquid crystal display (LCD) module 116 and a camera module 118.

Still referring to FIG. 1, a MDDI link 110 connects camera module 118 to MSM 102. Typically, a MDDI link controller is integrated into each of camera module 118 and MSM 102. In the example of FIG. 1, a MDDI host 122 is integrated into camera module 118, while a MDDI client 106 resides on the MSM side of MDDI link 110. Typically, the MDDI host is the master controller of the MDDI link. In the example of FIG. 1, pixel data from camera module 118 are received and formatted into MDDI packets by MDDI host 122 before being transmitted onto MDDI link 110. MDDI client 106 receives the MDDI packets and re-converts them into pixel data of the same format as generated by camera module 118. The pixel data are then sent to an appropriate block in MSM 102 for processing.

Still referring to FIG. 1, a MDDI link 112 connects LCD module 116 to MSM 102. In the example of FIG. 1, MDDI link 112 interconnects a MDDI host 108, integrated into MSM 102, and a MDDI client 120 integrated into LCD module 116. In the example of FIG. 1, display data generated by a graphics controller of MSM 102 are received and formatted into MDDI packets by MDDI host 108 before being transmitted onto MDDI link 112. MDDI client 120 receives the MDDI packets and re-converts them into display data for use by LCD module 116.

Frame Structure

Figure 2A:
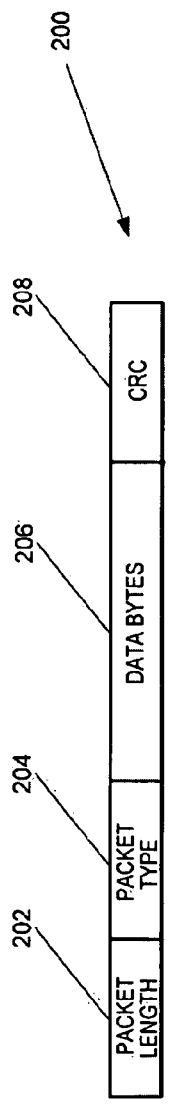
FIG. 2A shows a typical MDDI packet structure.

The original frame structure is described in U.S. Pat. No. 6,760,772 B2, entitled "Generating and Implementing a Communication Protocol and Interface for High Data Rate Signal Transfer", issued Jul. 6, 2004 ('772 patent). This original packet structure 200 is shown in FIG. 2A. The fields depicted in FIG. 2A include, packet length 202, which is typically a 16-bit value that specifies the total number of bytes in the packet, not including packet length field 202, packet type 204, which is a 16-bit unsigned integer that specifies the type of information contained in packet 200, data bytes 206, which is the data sent between the host and client, and CRC 208, which is a 16-bit cyclic redundancy check calculated over data bytes 206, packet type 204, and packet length fields 202.

Figure 2B:
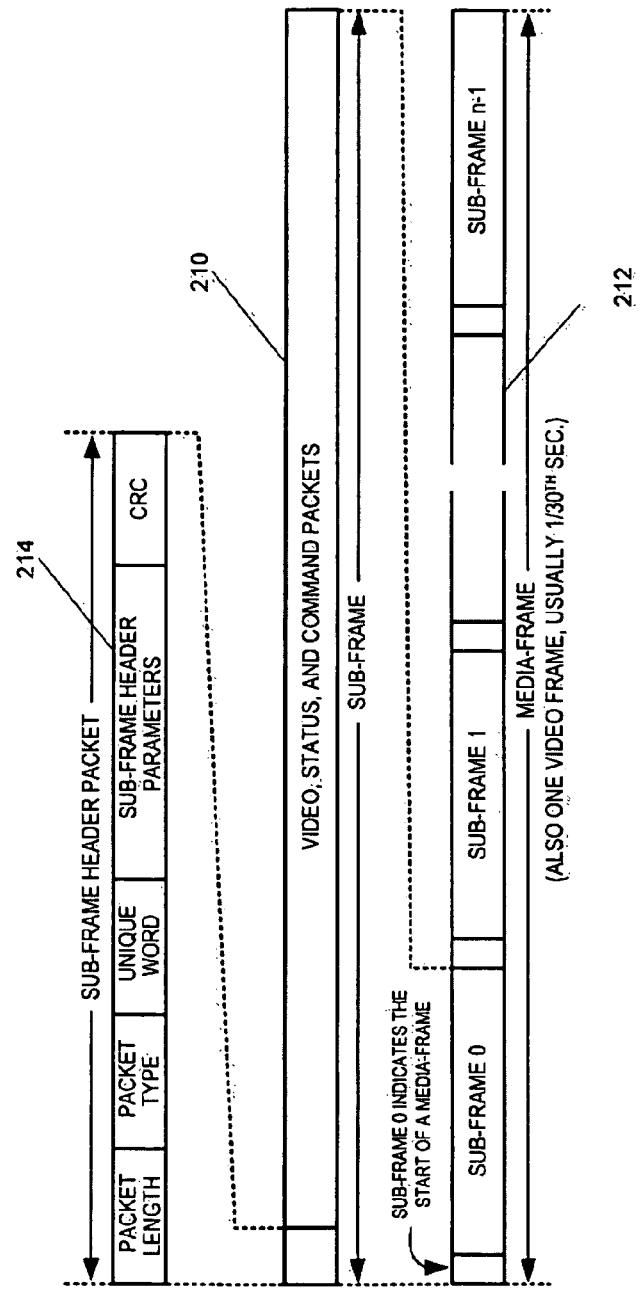
FIG. 2B depicts a typical forward link structure.

As shown in FIG. 2B, information transmitted over the MDDI link is grouped into packets. Multiple packets are grouped into a sub-frame 210, and multiple sub-frames make up a media frame 212. Every sub-frame 210 begins with a sub-frame header packet 214.

Figure 3:
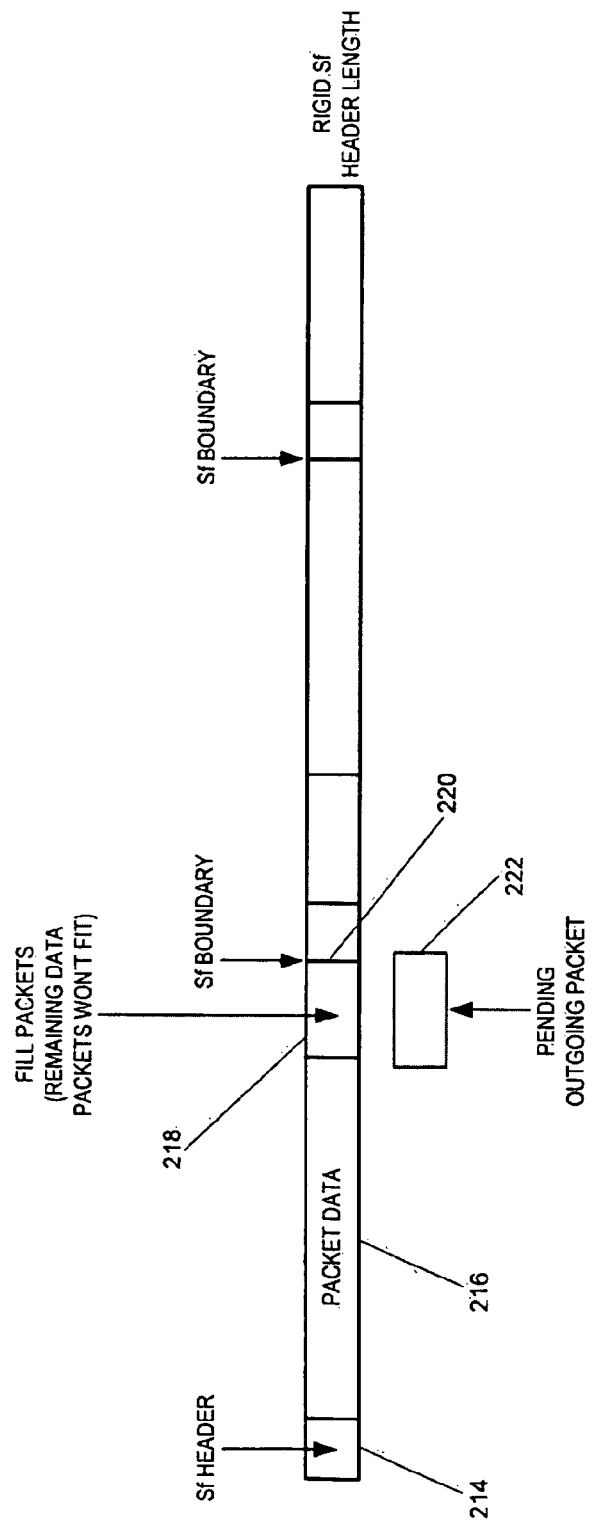
FIG. 3 shows the prior art sub-frame with a fixed length.

FIG. 3 shows the prior art sub-frame with a fixed length. Shown is sub-frame header packet 214, packet data 216 followed by fill packets 218 and sub-frame boundary 220. The problem arises when pending outgoing packet 222 is too large to fit within the remaining portion of a sub-frame 218, as shown. Thus, pending outgoing packet 222 must wait until the next sub-frame to be transmitted. Instead, fill packets are transmitted for the duration of the current sub-frame. This wastes bandwidth and unnecessarily consumes additional power. The new frame structures described below can operate in the same mode as disclosed in the '772 patent; however, two new operational modes are provided that modify the definition of sub-frame length and timing, thus improving performance. The two operational modes listed below will be identified with a protocol version field contained within the sub-frame header packet. To ensure compatibility, for client devices that are not hardwired to a host, the MDDI link can be brought up, adhering to the prior art frame structure first to verify the client can support the new frame structures introduced below. Once verified, the host can move to the new frame structure. This can all be done in the first sub-frame to provide a quick transition to either of the two formats described below.

Flexible Sub-Frame Length

Figure 4:
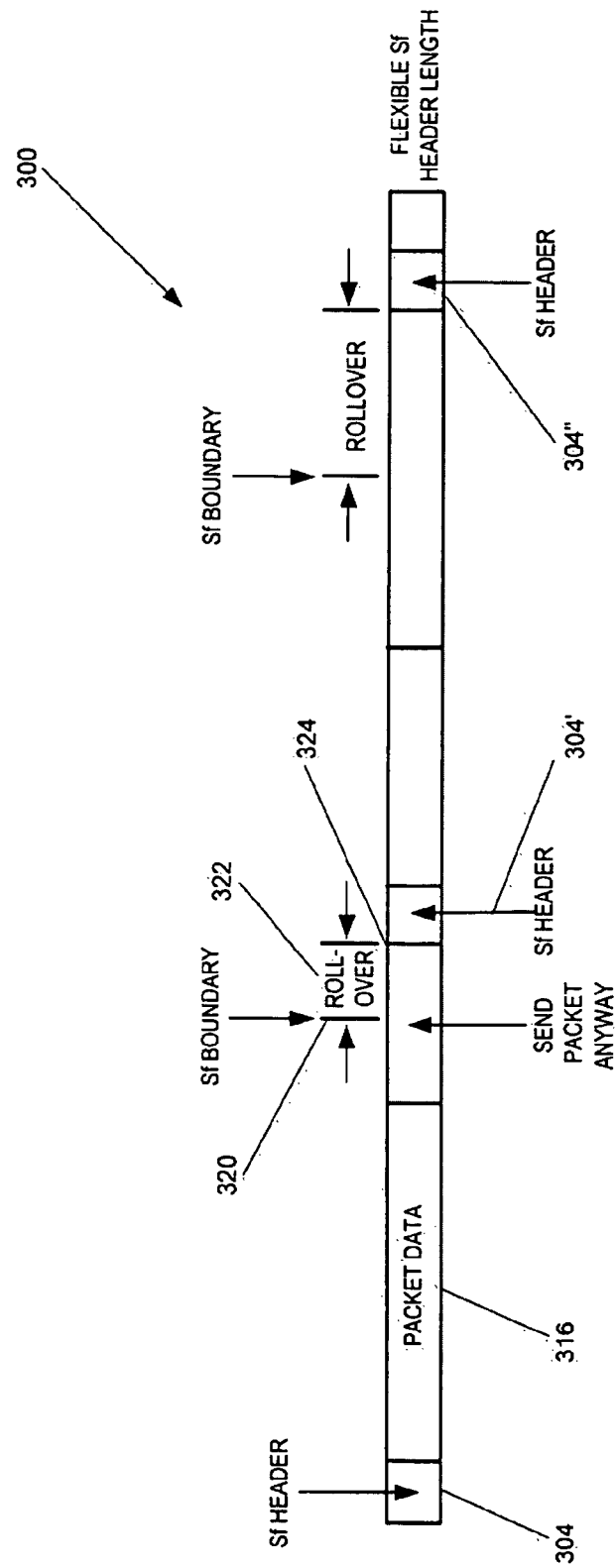
FIG. 4 depicts the flexible length sub-frame.

The first operation mode provides for a "flexible" sub-frame length, as shown in FIG. 4. Flexible length sub-frame 300 has sub-frame header packet 304, packet data 316, and an identified sub-frame boundary 320. Flexible length sub-frame 300 sends a sub-frame header packet 304 at sub-frame boundary 320. When a packet is requested to be transmitted, it will never be blocked, even if the packet crosses one or more sub-frame boundaries 320. This mode of operation allows the MDDI host to transmit the next sub-frame header packet 304' at the next available opportunity after the number of bytes transmitted in the sub-frame length field have completed, including rollover data 322. The advantage of this operation mode is that a packet will no longer need to be split between two sub-frames if the data becomes available at the end for the first sub-frame for transmission. Likewise it also prevents delaying until the next sub-frame being transmitted for a packet that will not fit in the remaining bytes for the current sub-frame. Sub-frame header packets 304' should be the first packet transmitted after the current packet completes the total number of bytes transmitted in the current sub-frame over the sub-frame length specified to packet end 324. This method does still provide sub-frame header packets 304 which provide resynchronization points for transmission links that are riot completely reliable. Text sent in a sub-frame after a long sub-frame is shortened by the amount the previous long sub-frame goes over to create an average sub-frame length. The flexible sub-frame length concept maintains timing that should average out to be similar to the sub-frame timing of the fixed sub-frame length system of FIG. 3, but never prevents the transmission of a packet and does not waste bandwidth.

Unlimited Sub-Frame Length

Figure 5:
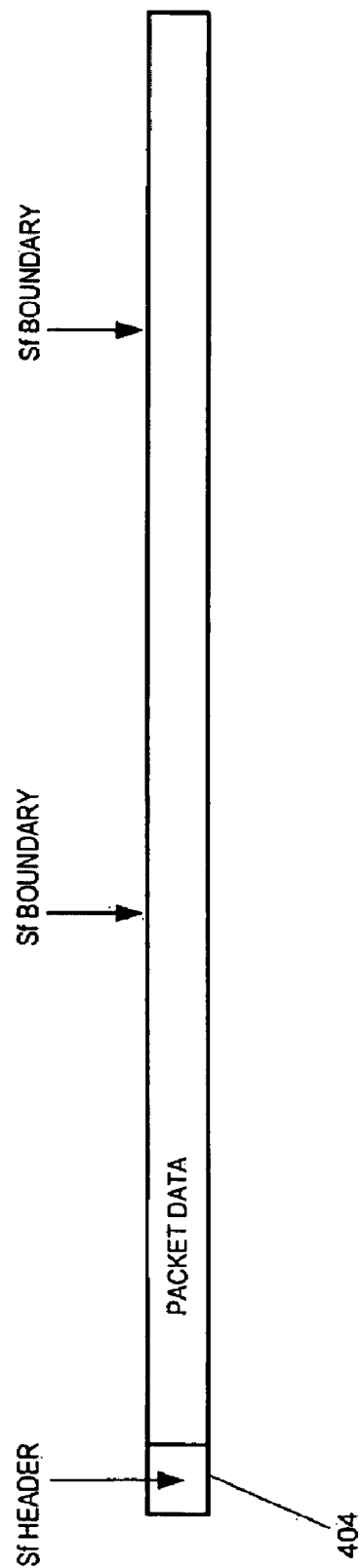
FIG. 5 depicts the unlimited length sub-frame.

This second operational mode allows the host to only use only one sub-frame for the duration of the active MDDI link, as shown in FIG. 5. This means that the MDDI host will transmit only one sub-frame header packet 404 as the link comes put of hibernation and does not transmit any more. The advantage to this operational mode is that there is no additional bandwidth used to transmit other sub-frame header packets. It is still permissible to transmit sub-frame header packets while in this operational mode to allow for a resynchronization, however the number of bytes between these packets will be arbitrary and transmitted at the MDDI host's discretion.

Windowless Video Stream Packet

Figure 6:
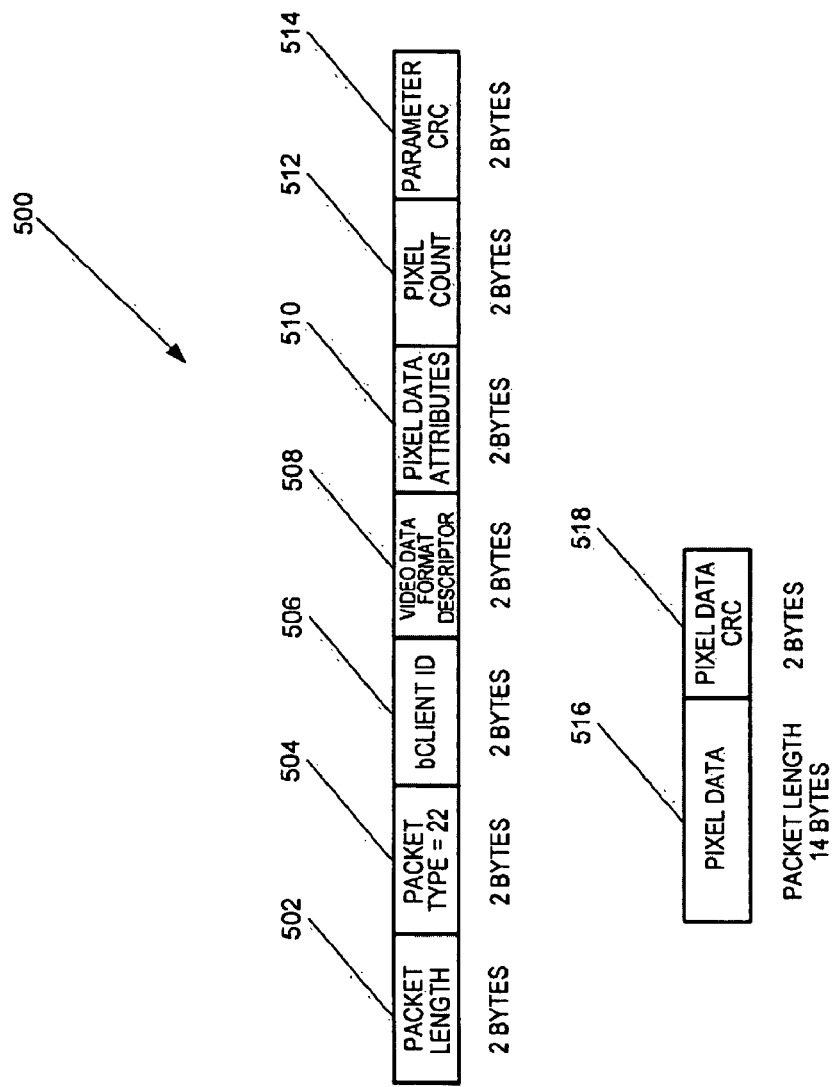
FIG. 6 shows the windowless video stream packet.

The windowless video stream packet allows for windowing information to be left out of the video packet. The windowing information in the prior art version of the video stream packet included X left edge, Y top edge, X right edge, Y bottom edge, X start and Y start. FIG. 6 depicts the windowless video stream packet. As can be seen, several of the attributes are similar to the prior art video stream packet. Windowless video stream packet 500 includes packet length 502, which contains 2 bytes that contain a 16-bit integer that specifies the total number of bytes, minus two bytes, in windowless video stream packet 500. A packet type 504 consists of 2 bytes that contain a 16-bit integer that identifies in two bytes the type of packet. In this example packet type is identified as 22, for windowless video stream packet 500 operation. Next, bClient ID 506 field is shown. These are two bytes that contain a 16-bit unsigned integer for identifying a client ID. Next, is video data format descriptor 508. Video format descriptor 508 provides information for the beginning of a new frame and is also a two byte, 16-bit unsigned integer.

Next are pixel data attributes 510, which are also a two-byte, 16-bit unsigned integer that identifies the various attributes of the pixel data. Pixel count 512 comprises a two-byte, 16-bit unsigned integer that specifies the number of pixels in pixel data 516 field. Parameter CRC 514 comprises a two-bytes that contain a 16-bit CRC of all bytes from packet length 502 to pixel count 512. Pixel data 516 contains the raw video information to be displayed. Pixel data CRC 518 comprises two bytes that contain a 16-bit CRC of only pixel data 516. This packet is used for operational modes where the entire display region is constantly refreshed. This is accomplished by sending a second windowless video data packet by the host to the client with the vertical sync removed to increment a location of pixel data on the data screen.

Flexible Video Stream Packet

Figure 7:
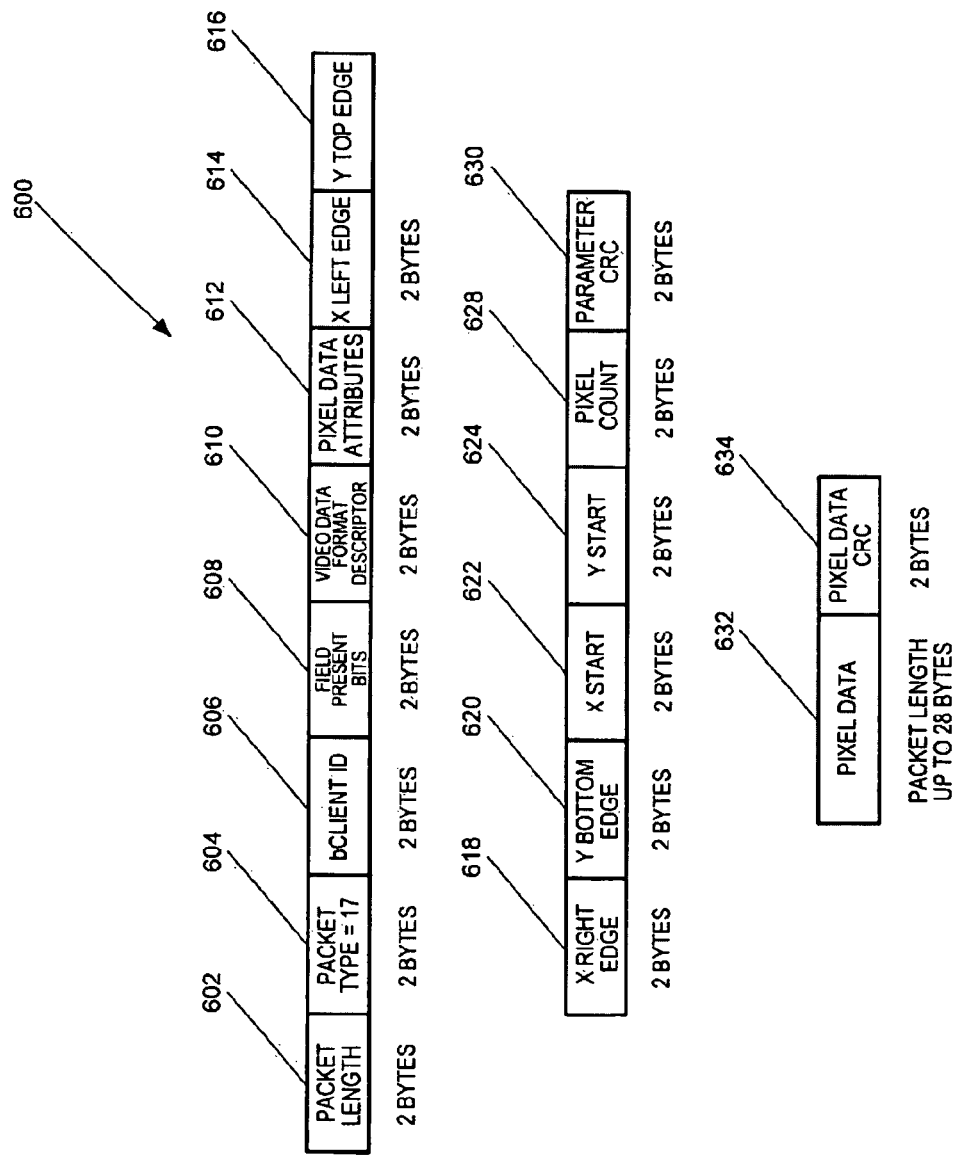
FIG. 7 shows the flexible video stream packet.

Flexible video stream packet, as shown in FIG. 7, provides a way to specify which fields are contained within a video stream packet with the inclusion of field present bits. Each bit in this field indicates whether the packet contains the corresponding field. If a field is not contained in the packet then it is assumed that the value should remain the same as the last time that field was transmitted in a video packet. If that field has not been transmitted previously, then the value can be assumed to be zero.

Flexible video stream packet 600 has the following packet contents:

Packet length 602 comprises 2 bytes that contain a 16-bit unsigned integer that specifies the total number of bytes in the packet not including the packet length field. This value will depend on the pixel data size as well as which packets will be included.

Packet type 604 comprises 2 bytes that contain a 16-bit unsigned integer. In this example a packet type of 17 identifies the packet as a flexible video stream packet 600.

The next field is bClient ID 606 which comprises 2 bytes that contain a 16-bit unsigned integer reserved for the client ID.

Field present bits 608, a value of '1' for each bit indicates that the field is present in the packet. A value of '0' for the bit indicates that the field is not present. The ordering of the fields is as set forth in FIG. 7.

Video data format descriptor 610 provides information for the beginning of a new frame and is also a two byte, 16-bit unsigned integer. Next are pixel data attributes 612, which are also a two-byte, 16-bit unsigned integer that identify the various attributes of the pixel data. X left edge 614 comprises 2 bytes that contain a 16-bit unsigned integer that specifies the X coordinate of the left edge of the screen window filled by pixel data 632 field. Y top edge 616 comprises 2 bytes that contain a 16-bit unsigned integer that specifies the Y coordinate of the top edge of the screen window filled by pixel data 632 field. X right edge 618 comprises 2 bytes that contain a 16-bit unsigned integer that specifies the X coordinate of the right edge of the screen window filled by pixel data 632 field. Y bottom edge 620 comprises 2 bytes that contain a 16-bit unsigned integer that specifies the Y coordinate of the bottom edge of the screen window filled by pixel data 632 field. X start 622 comprises 2 bytes that contain a 16-bit unsigned integer that specifies the absolute X coordinate, where the point (X start 622 and Y start 624) is the first pixel in pixel data 632 field. Y start 624 comprises 2 bytes that contain a 16-bit unsigned integer that specifies the absolute Y coordinate, where the point (X start 622 and Y start 624) is the first pixel in pixel data 632 field.

Pixel count 628 comprises a two-byte, 16-bit unsigned integer that specifies the number of pixels in pixel data 632 field. Parameter CRC 630 comprises two-bytes that contain a 16-bit CRC of all bytes from packet length 602 to the byte transmitted just prior to this parameter CRC 630. Pixel data 632 contains the raw video information to be displayed. In this example, if bit 5 of pixel date attributes 612 field is set to one then pixel data 632 field contains exactly one row of pixels, where the first pixel transmitted corresponds to the left-most pixel and the last pixel transmitted corresponds to the right-most pixel. Pixel data CRC 634 comprises two bytes that contain a 16-bit CRC of only pixel data 632.

Enhanced Reverse Link Encapsulation Packet

Figure 8:
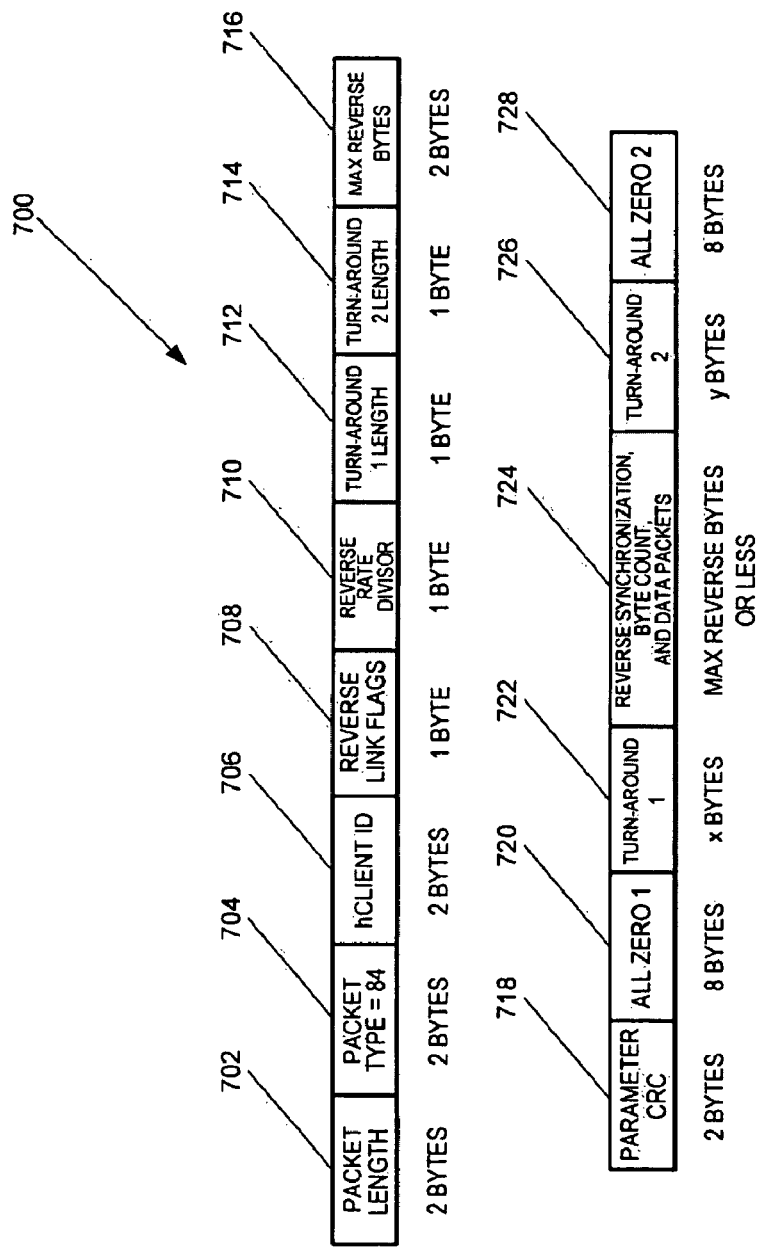
FIG. 8 shows the enhanced reverse link encapsulation packet.

The enhanced reverse link encapsulation packet is shown in FIG. 8. This packet combines the functionality of the round trip delay measurement packet to help align the host to the incoming data stream with the reverse link encapsulation packet used to transfer data from the client to the host, as described in the prior version of the MDDI system. This packet uses a synchronization pattern to find the alignment of the incoming byte data. Once the synchronization pattern is found in the incoming data stream, the host can reliably sample the remaining reverse link data bits to put together a reverse link data and packet stream.

The packet contents for enhanced reverse link encapsulation packet 700 are as follows:

Packet length 702 comprises 2 bytes that contain a 16-bit unsigned integer that specifies the total number of bytes in the packet not including packet length 702 field.

Packet type: 704 comprises 2 bytes that contain a 16-bit unsigned integer. In this example, a packet type 704 of 84 identifies the packet as an enhanced reverse link encapsulation packet 700.

The next field is hClient ID 706 comprising 2 bytes that contain a 16-bit unsigned integer reserved for the client ID.

Reverse link flags 708 comprise 1 byte that contains an 8-bit unsigned integer that contains a set of flags to request information from the client and specify the reverse link interface type. In this example, if a bit is set to one, then the host requests the specified information from the client. If the bit is zero then the host does not need the information from the client. For example, Bit 0 could indicate that the host needs a client capability packet. It shall be sent by the client to the host in reverse data packets 724 field. Bit 1 could indicate that the host needs the client request and status packet. It shall be sent by the client to the host in reverse data packets 724 field. Bit 2 could indicate that the host needs the client to transmit a synchronization byte before transmitting the first data byte of a reverse link packet 724. Bit 3 could indicate that the host requires the client to transmit the amount of reverse bytes to expect before starting reverse packet transmission. This is to allow for reverse link packets of dynamic size that will exactly meet the requirements of the clients currently pending reverse link data update.

Reverse rate divisor 710 comprises 1 byte that contains an 8-bit unsigned integer that specifies the number of MDDI_Stb cycles that occur per reverse link data clock. The reverse link data clock is equal to the forward link data clock divided by the quantity: two times reverse rate divisor 710. The reverse link data rate is related to the reverse link data clock and the interface type oh the reverse link in the following example:

Interface Type 1 indicating the reverse data rate equals the reverse link data clock;

Interface Type 2 indicating the reverse data rate equals two times reverse link data clock;

Interface Type 3 indicating that the reverse data rate equals four times reverse link data clock; and Interface Type 4 indicating that the, reverse data rate equals eight times reverse link data clock.

Turn-around 1 length 712 comprises 1 byte that contains an 8-bit unsigned integer that specifies the total number of bytes that are allocated for turn-around 1. The recommended length of turn-around 1 is the number of bytes required for the MDDI_Data drivers in the host to disable their outputs. This is based on the output disable time, the forward link data rate, and the forward link interface type selection being used. Turn-around 2 length 714 comprises 1 byte that contains an 8-bit unsigned integer that specifies the total number of bytes that are allocated for turn-around 2. The recommended length of turn-around 2 is the number of bytes required for the round-trip delay plus the time required for the host to enable its MDDI_Data drivers. Turn-around 2 length may be also be any value larger than the minimum required value calculated to allow sufficient time to process reverse link packets in the host. Max reverse bytes 716 comprises 2 bytes that indicate how many reverse bytes can by transmitted from the client back to the host. This does not include any required bytes such as the synchronization pattern, or the client transmit byte length fields which may precede reverse link data when requested by bits in the reverse link flags 708 field. When bit 3 is set the client may request to send data that is less than the value in the max reverse bytes 716 field. When the client transmits a number that is less than the max reverse bytes 716 field, the MDDI will shorten the anticipated period of the reverse data and synchronization 724 field to maximize the clients request. Parameter CRC 718 comprises 2 bytes that contain a 16-bit CRC of all bytes from packet length 702 to turn-around length 712 and max reverse byte 716 field. If this CRC fails to check then the entire packet should be discarded. All zero 1 720 comprises 8 bytes that each contain an 8-bit unsigned integer equal to zero. This field ensures that all MDDI_Data signals are at a logic-zero level for a sufficient time to allow the client to begin recovering clock using only MDDI_Stb prior to disabling the host's line drivers during turn-around 1 722 field. Turn-around 1 722 comprises a first turn-around period. The number of bytes specified by turn-around 1 length 712 parameter is allocated to allow the MDDI_Data line drivers in the client to enable before the line drivers in the host are disabled. The client shall enable its MDDI_Data line drivers during bit 0 of turn-around 1 722 and the host shall disable its outputs and be completely disabled prior to the last bit of turn-around 1 722. The MDDI_Stb signal behaves as though MDDI_Data0 were at a logic-zero level during the entire turn-around 1 722 period.

Reverse synchronization, byte count, and data packets 724 are shown as a single field in FIG. 8. The first byte in this field should be the synchronization pattern (0x053F) if requested by bit two being set to logic one in reverse link flags 708 field. If bit three is set the next transmitted reverse link field should be the number of bytes the client will transmit on the reverse link. If this data is not requested, the client can transmit reverse link data up to the number of bytes specified in max reverse bytes 716 field. This field should be followed by the packet length field of the first reverse link packet. More than one packet can be transmitted in the reverse data period if there is enough room. The client may send filler packets or drive the MDDI_Data lines to a logic-zero level when it has no data to send to the host. If the MDDI_Data lines are driven to zero the host will interpret this as a packet with a zero length (not a valid length) and the host will accept no additional packets from the client for the duration of the current enhanced reverse link encapsulation packet 700. Turn-around 2 726 comprises the second turn-around period. The number of bytes is specified by the turn-around 2 length 714 parameter. The host shall enable its MDDI_Data line drivers and be completely enabled prior to the last bit of turn-around 2 726 and the client shall disable its outputs and be completely disabled prior to the last bit of turn-around 2 726. The purpose of turn-around 2 726 is to allow the remaining amount of data from reverse data packets 724 field to be transmitted from the client. Due to variations in different systems and the amount of safety margin allocated it is possible that neither the host nor client will be driving the MDDI_Data signals to a logic-zero level during some parts of the turn-around 2 726 field as seen by the line receivers at the host. The MDDI_Stb signal behaves as though MDDI_Data0 were at a logic-zero level during the entire turn-around 2 726 period. All zero 2 728 comprises 8 bytes that each contain an 8-bit unsigned integer equal to zero. This Field ensures that all, MDDI_Data signals are at a logic-zero level for a sufficient time to allow the client to begin recovering clock using both MDDI_Data0 and MDDI_Stb after enabling the host's line drivers following the turn-around 2 726 field.

MDDI Link Freeze

Figure 9:
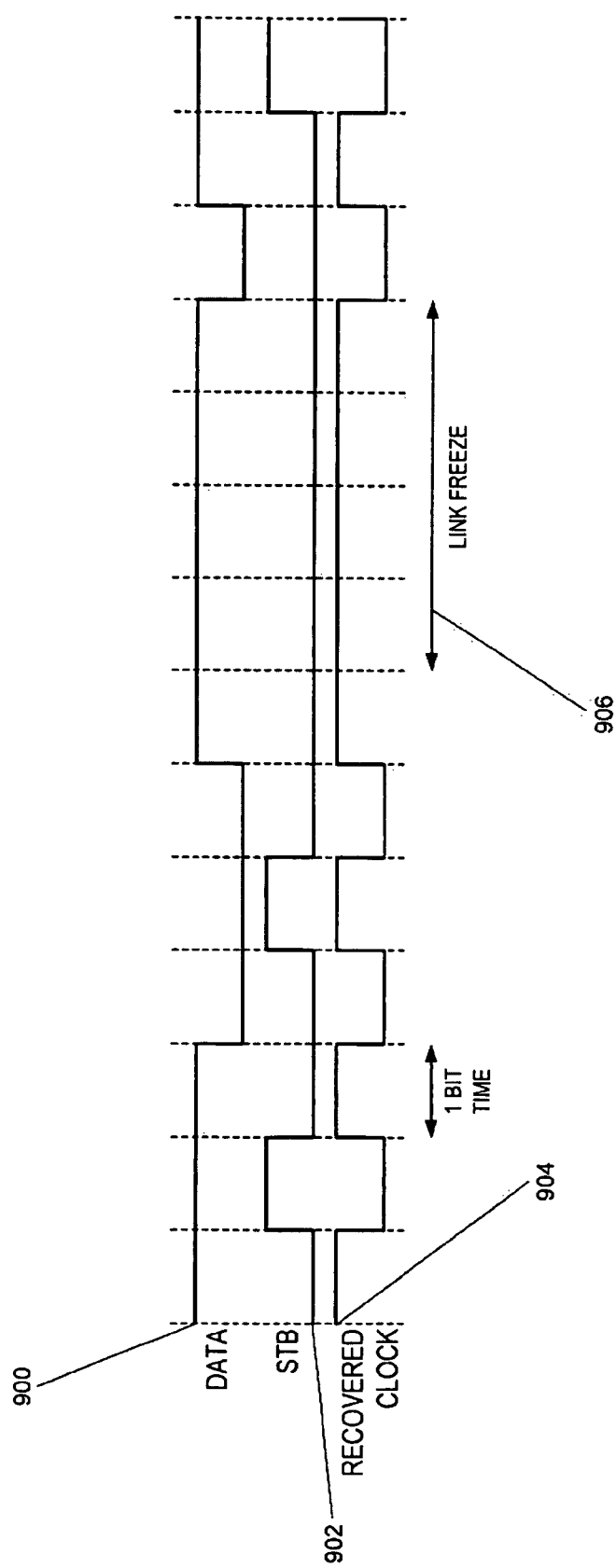
FIG. 9 depicts the link freeze.

The MDDI host may find times where it needs to halt the MDDI data link, or pause the operation of the link. FIG. 9 shows the link freeze aspect of the presently claimed invention. FIG. 9 shows MDDI data 900, strobe (STB) 902, and recovered clock 904. This aspect allows MDDI data 900 to be stopped for a short period of time 906 and freeze the current state of the MDDI client. As shown, recovered clock 904 in the client is derived from incoming MDDI data stream 900 and MDDI strobe 902, and as a result, stopping the MDDI link will stop any more clock cycles 906 from being seen within the client. The host must maintain the differential levels corresponding to the last transmitted data bit when entering this mode. The MDDI host is not required to transmit any special packet indicating it is entering this mode, and may freeze the link in the middle of an outgoing packet if necessary. This can be used to prevent underflows within a MDDI host design if other data sources are briefly unable to keep up with the outgoing MDDI data stream.

Due to the additional power consumption of keeping MDDI data 900 and strobe 902 signals driven, this state should only be used in short duration situations. When there is no meaningful content to be transmitted for a longer period of time, the hibernation mode should be used to keep power consumption to a minimum.

In many clients there will be a processing pipeline delay for decoding incoming packets. Stalling the MDDI right after a packet is transmitted from the host does not meet the requirements of the client, and the client should have a chance to process the data contained within the last packet.

Signals coming out of the MDDI client will also be frozen in a particular state due to the lack of a clock. Any designs making use of the MDDI client must be aware of the possibility of this condition.

This specification discloses one or more aspects that incorporate the features of the claimed invention. The disclosed aspects merely exemplify the claimed invention. The scope of the claimed invention is not limited to the disclosed aspects. The invention is defined by the claims appended hereto.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

The invention claimed is:

1. A method of sending a windowless video data packet over a transmission link that couples a client and a host within an electronic device, the method comprising the steps of:
    providing a field present bit indicator to indicate that predetermined fields will not be transmitted in the windowless video data packet by the host;
    removing X-left, X-Right, V-Top, V-Bottom, X-Start, and V-Start field coordinates from a video data packet, comprising targeting a full screen update, by the host;
    providing a vertical sync in a field of the video data packet, by the host, the vertical sync indicating a first line of a data screen, wherein the step of removing and providing comprises creating the windowless video data packet; and
    sending the windowless data video packet by the host to the client, further comprising not transmitting repeated fields.

2. The method of claim 1 further comprising the step of updating a full line of the data screen.

3. The method of claim 2 further comprising the step of sending a second windowless video data packet by the host to the client with the vertical sync removed to increment a location of pixel data on the data screen.

4. A system for sending a windowless video data packet over a transmission link that couples a client and a host within an electronic device, the system comprising:
    means for providing field present bit indicator to indicate that predetermined fields will not be transmitted in the windowless video data packet, by the host;
    means for removing X-left, X-Right, V-Top, V-Bottom, X-Start, and V-Start field coordinates from a video data packet, comprising targeting a full screen update, by the host;
    means for providing a vertical sync in a field of the video data packet, by the host, the vertical sync indicating a first line of a data screen, wherein the means for removing and providing comprises the windowless video data packet; and
    means for sending the windowless data video packet by the host to the client further comprising not transmitting repeated fields.

5. The system of claim 4 further comprising a means for updating a full line of the data screen.

6. The system of claim 5 further comprising a means for sending a second windowless video data packet by the host to the client with the vertical sync removed to increment a location of pixel data on the data screen.

7. A non-transitory computer-executable medium for storing executable program instructions to implement a windowless video data packet to be sent over a transmission link that couples a client and a host within an electronic device, the medium for storing comprising:
    program instructions that cause a field present bit indicator be provided to indicate that predetermined fields will not be transmitted in the windowless video data packet, by the host;
    program instructions that cause a removal of X-left, X-Right, Y-Top, Y-Bottom, X-Start, and V-Start field coordinates from a video data packet, comprising targeting a full screen update, by the host;
    program instructions that cause a vertical sync to be provided in a field of the video data packet, by the host, the vertical sync indicating a first line of a data screen, wherein the removal of the field coordinates and provision of the vertical sync comprises the windowless video data packet; and
    program instructions that cause the windowless data video packet to be sent by the host to the client, further comprising not transmitting repeated fields.

8. The medium for storing of claim 7 further comprising program instructions that cause a full line of the data screen to be updated.

9. The medium for storing of claim 8 further comprising program instructions that cause a second windowless video data packet to be sent by the host to the client with the vertical sync removed to increment a location of pixel data on the data screen.

* * * * *